United States Patent
Hirakawa

(10) Patent No.: US 10,422,875 B2
(45) Date of Patent: Sep. 24, 2019

(54) FASTENING MEMBER, AND OBSTACLE DETECTING DEVICE EMPLOYING FASTENING MEMBER

(71) Applicant: Panasonic Intellectual Property Management Co., Ltd., Osaka (JP)

(72) Inventor: Osamu Hirakawa, Mie (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 439 days.

(21) Appl. No.: 15/104,525

(22) PCT Filed: Jan. 20, 2015

(86) PCT No.: PCT/JP2015/000215
§ 371 (c)(1),
(2) Date: Jun. 14, 2016

(87) PCT Pub. No.: WO2015/111399
PCT Pub. Date: Jul. 30, 2015

(65) Prior Publication Data
US 2017/0038470 A1 Feb. 9, 2017

(30) Foreign Application Priority Data
Jan. 27, 2014 (JP) .................. 2014-012617

(51) Int. Cl.
*G01S 15/00* (2006.01)
*G01S 15/93* (2006.01)
(Continued)

(52) U.S. Cl.
CPC .......... *G01S 15/931* (2013.01); *B60R 19/483* (2013.01); *G01S 7/521* (2013.01); *G01S 2015/938* (2013.01)

(58) Field of Classification Search
USPC ........................................... 367/173
See application file for complete search history.

(56) References Cited

U.S. PATENT DOCUMENTS 6,279,210 B1 8/2001 Faass et al.
6,805,000 B1 * 10/2004 Sheikh-Bahaie ... B60C 23/0408
73/146
(Continued)

FOREIGN PATENT DOCUMENTS

EP 2407802 1/2012
JP 2001-502406 2/2001
(Continued)

OTHER PUBLICATIONS

International Search Report of PCT application No. PCT/JP2015/000215 dated Apr. 21, 2015.

*Primary Examiner* — James R Hulka
(74) *Attorney, Agent, or Firm* — Greenblum & Bernstein, P.L.C.

(57) ABSTRACT

A fastening device is configured to be used for fastening an object to a target device. The fastening device includes a holder part configured to hold the object, a fastening part configured to be bonded to the target device, a contact part allowing the fastening part to be located between the contact part and the holder part, and a connecting part for connecting the contact part with the fastening part while allowing the protruding length to be variable. The contact part protrudes toward the target device more than the fastening part by a protruding length, the contact part contacting the target device before the fastening part contacts the target device when being fastened to the target device. This fastening device improves workability.

14 Claims, 10 Drawing Sheets

(51) Int. Cl.
  *G01S 7/521*  (2006.01)
  *B60R 19/48* (2006.01)

(56) References Cited

U.S. PATENT DOCUMENTS

| | | | | |
|---|---|---|---|---|
| 7,290,351 | B2* | 11/2007 | Niarfeix | G01P 3/443 33/613 |
| 7,902,968 | B2* | 3/2011 | Kojima | G10K 11/004 340/435 |
| 8,411,532 | B2* | 4/2013 | Tsuzuki | G01S 7/521 367/140 |
| 8,817,576 | B2* | 8/2014 | Tsuzuki | G01S 7/521 367/118 |
| 2005/0073299 | A1* | 4/2005 | Yoshikawa | G01D 5/145 324/207.25 |
| 2006/0022844 | A1 | 2/2006 | Kawashima | |
| 2006/0248947 | A1* | 11/2006 | Phalak | B60C 23/0408 73/146 |
| 2007/0115758 | A1* | 5/2007 | Kojima | G01S 7/521 367/197 |
| 2011/0242941 | A1* | 10/2011 | Tsuzuki | G01S 7/521 367/118 |
| 2011/0242942 | A1* | 10/2011 | Tsuzuki | G01S 7/521 367/121 |
| 2013/0121629 | A1* | 5/2013 | Takada | G01P 1/026 384/448 |
| 2013/0250732 | A1 | 9/2013 | Tsuji et al. | |
| 2014/0355382 | A1 | 12/2014 | Tsuji et al. | |

FOREIGN PATENT DOCUMENTS

| | | |
|---|---|---|
| JP | 2006-047008 | 2/2006 |
| JP | 2009-227085 | 10/2009 |
| JP | 2012-026805 A | 2/2012 |
| JP | 2012-122936 | 6/2012 |
| JP | 2013-086616 | 5/2013 |
| JP | 2013-136320 | 7/2013 |
| JP | 2013-221880 A | 10/2013 |
| WO | 2013/114466 | 8/2013 |

* cited by examiner

FASTENING MEMBER, AND OBSTACLE DETECTING DEVICE EMPLOYING FASTENING MEMBER

CROSS-REFERENCE TO RELATED APPLICATIONS

This application is a U.S. national stage application of the PCT International Application No. PCT/JP2015/000215 filed on Jan. 20, 2015, which claims the benefit of foreign priority of Japanese patent application 2014-012617 filed on Jan. 27, 2014, the contents all of which are incorporated herein by reference.

TECHNICAL FIELD

The present invention relates to a fastening device used for fastening an object, and obstacle detectors using the fastening device.

BACKGROUND ART

An ultrasonic sensor that sends ultrasonic waves and receives ultrasonic waves reflected on an obstacle detects, for example, the presence of obstacle based on the wave reflected on the obstacle, and also detects a distance to the obstacle based on a time from sending ultrasonic waves to receiving reflected waves.

FIG. 12 is a sectional view of conventional ultrasonic sensor 502 disclosed in PTL 1. Ultrasonic sensor 502 is mounted on a target device 503, such as a bumper of vehicle, for use.

Ultrasonic sensor 502 shown in FIG. 12 is mounted to target device 503 by being held with fastening device 501 to be fastened to target device 503. Aperture 530 for exposing exposure surface 710 through which ultrasonic waves of ultrasonic sensor 502 mainly enter and exit is provided in target device 503. Dimensions and shapes of ultrasonic sensor 502 and fastening device 501 are designed such that a surface of target device 503 opposite to a surface on which fastening member 501 is fastened (e.g., an outer surface of the bumper) is substantially flush with exposure surface 710.

In above fastening device 501, when double-sided adhesive tape 610 is used for fastening onto target device 503, double-sided adhesive tape 610 is previously attached to one surface of fastening member 1 (hereafter referred to as "adhesive surface"), and fastening device 501 is bonded to target device 503 by pushing double-sided adhesive tape 610 against target device 503.

However, when double-sided adhesive tape 610 is used as described above, fastening device 501 may be fastened at a position deviated from a position where fastening device 501 is to be fastened if double-sided adhesive tape 610 contacts target device 503 at the deviated position.

FIG. 13 is a front view of conventional fastening device 601 disclosed in PTL 2. As shown in FIG. 13, protrusion 691 is provided on fastening device 601 to contact target device 503 before double-sided adhesive tape 610, thereby preventing double-sided adhesive tape from contacting target device 503.

With the above structure, protrusion 691 contacts target device 503 so as to prevent double-sided adhesive tape 610 from contacting target device 503, and to finely adjust a position of fastening device 601, thereby improving workability.

CITATION LIST

Patent Literature

PTL 1: Japanese Patent Laid-Open Publication No. 2012-122936
PTL 2: Japanese Patent Laid-Open Publication No. 2013-86616

SUMMARY

A fastening device is configured to be used for fastening an object to a target device. The fastening device includes a holder part configured to hold the object, a fastening part configured to be bonded to the target device, a contact part allowing the fastening part to be located between the contact part and the holder part, and a connecting part for connecting the contact part with the fastening part while allowing the protruding length to be variable. The contact part protrudes toward the target device more than the fastening part by a protruding length, the contact part contacting the target device before the fastening part contacts the target device when being fastened to the target device.

This fastening device improves workability.

DETAIL DESCRIPTION OF PREFERRED EMBODIMENT

Figure 1:
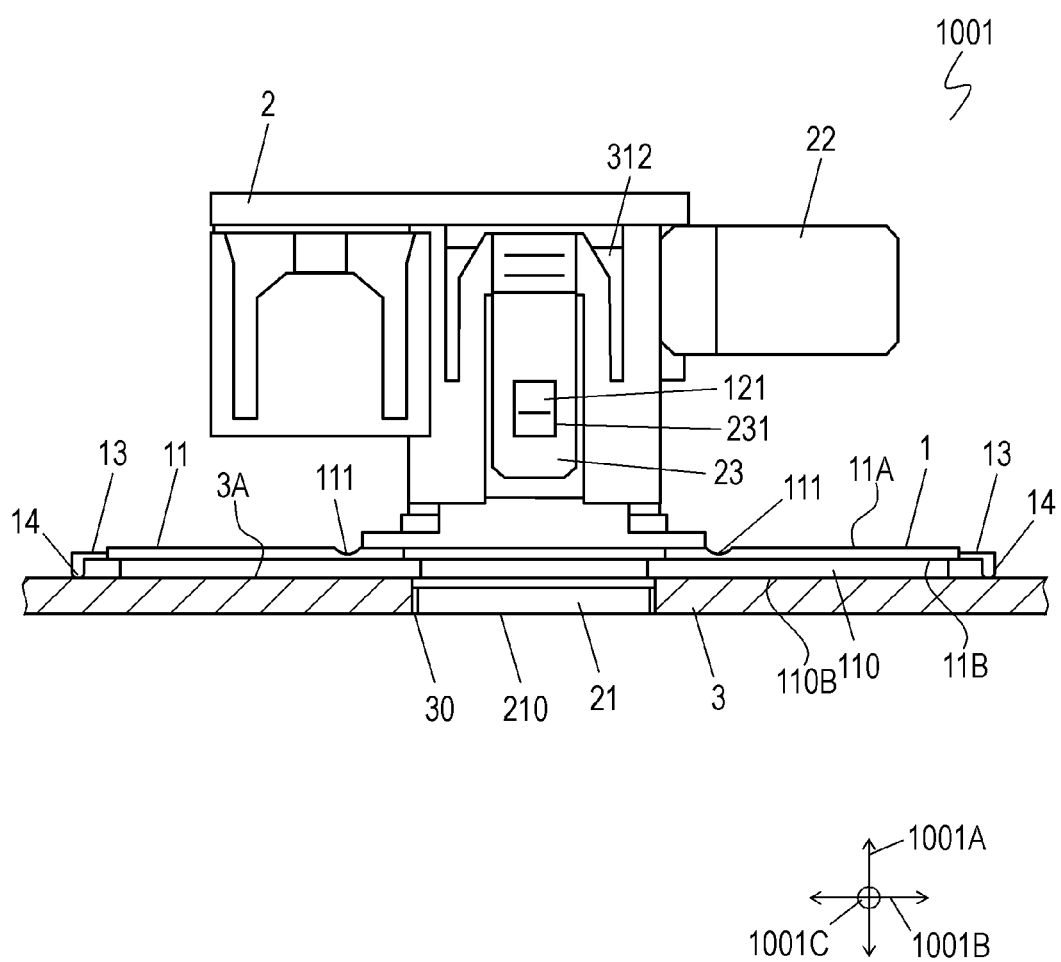
FIG. 1 is a front view of an ultrasonic sensor device in accordance with an exemplary embodiment.

FIG. 1 is a front view of ultrasonic sensor device 1001 which is an obstacle detector in accordance with an exemplary embodiment fastened onto target device 3. Ultrasonic sensor device 1001 includes ultrasonic sensor 2 and fastening device 1 fastening ultrasonic sensor 2 onto target device 3.

Figure 2:
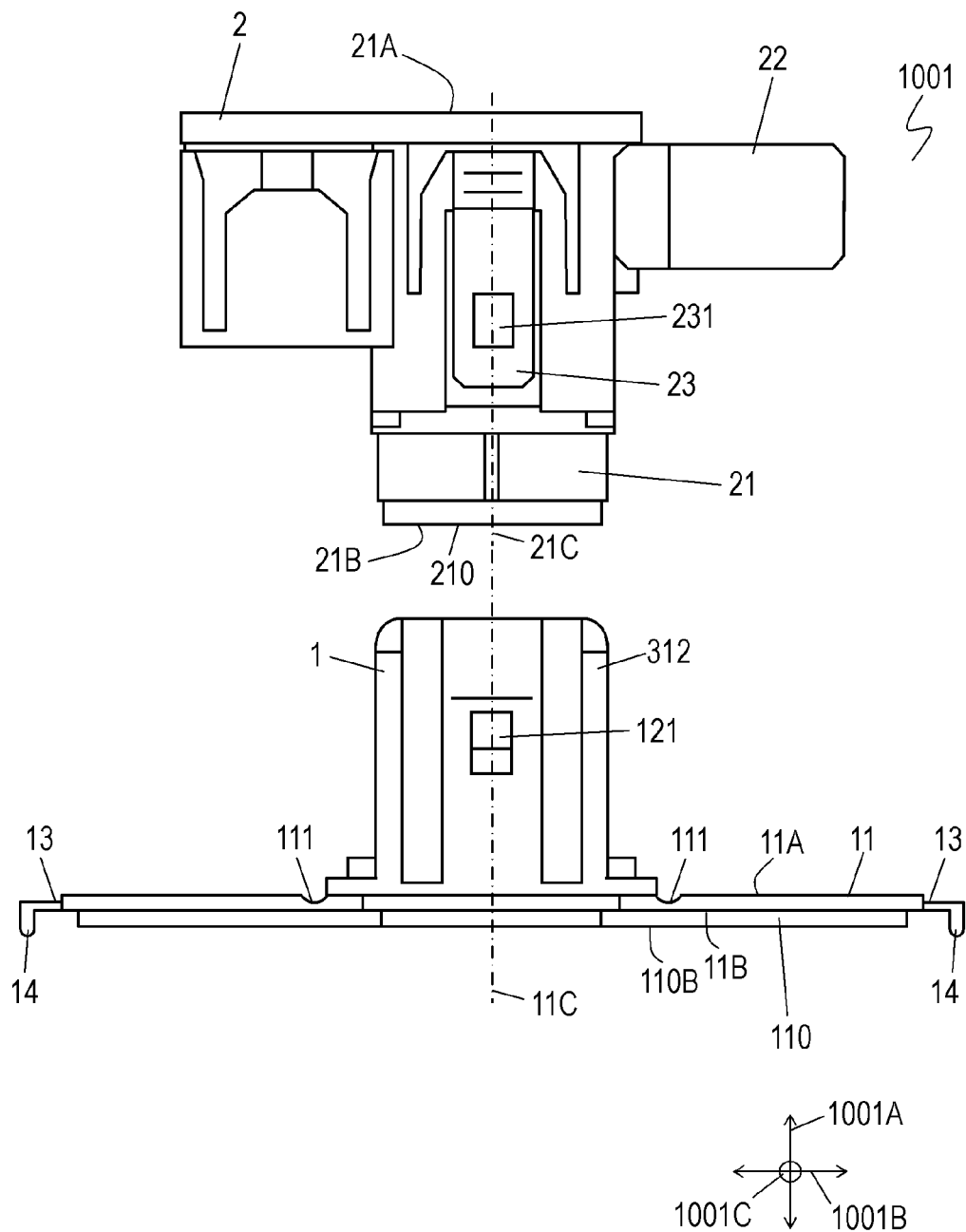
FIG. 2 is a front view of a fastening device and an ultrasonic sensor of the ultrasonic sensor device in accordance with the embodiment.
Figure 4A:
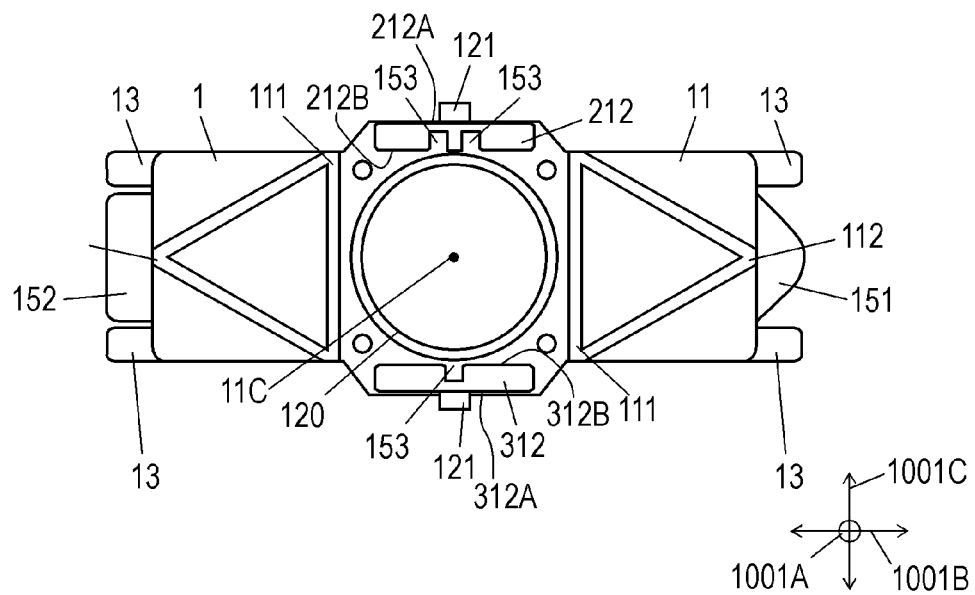
FIG. 4A is a top view of the fastening device of the ultrasonic sensor device in accordance with the embodiment.
Figure 4B:
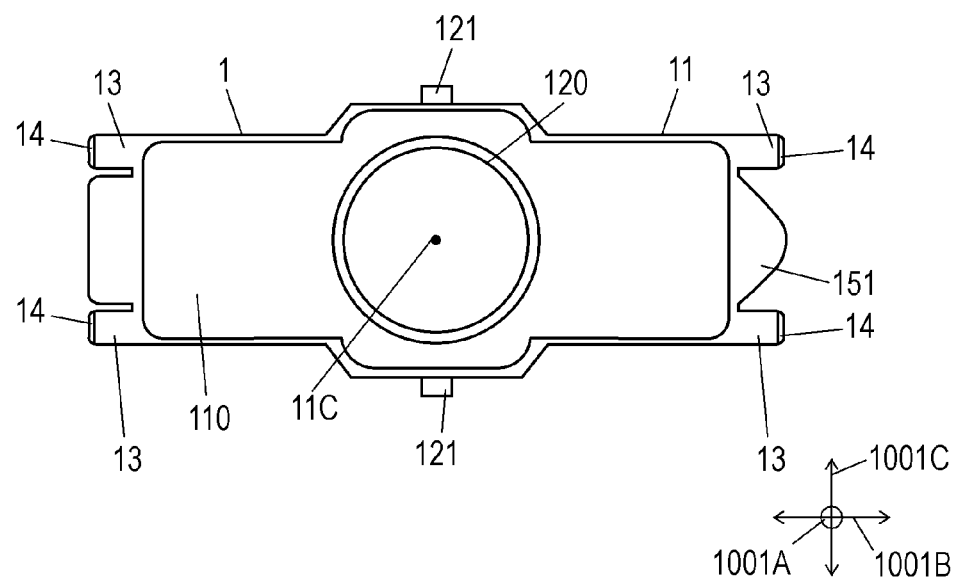
FIG. 4B is a bottom view of the fastening device in accordance with the embodiment.

FIG. 2 is a front view of ultrasonic sensor device 1001 and shows ultrasonic sensor 2 and fastening device 1. FIGS. 4A and 4B are a top view and a bottom view of fastening part 11, respectively. Upward and downward directions 1001A, right and left directions 1001B perpendicular to upward and downward directions 1001A, and front and back directions 1001C perpendicular to upward and downward directions 1001A and right and left directions 1001B are defined in FIGS. 1 and 2. Fastening device 1 includes fastening part 11 with adhesive surface 11B configured to be bonded to target device 3, and holder parts 212 and 312 configured to hold ultrasonic sensor 2 that is an object. Target device 3 has upper surface 3A configured to have fastening device 1 fastened thereto. Fastening part 11 protrudes from holder parts 212 and 213 in one of right and left directions 1001B. Adhesive surface 11B of fastening part 11 is a lower surface of fastening part 11. In accordance with the embodiment, terms indicating directions, such as "upward and downward directions", "right and left directions", "front and back directions", "upper surface", and "lower surface", indicate relative directions determined only by relative positional relationship of components of fastening device 1, and do not indicate absolute directions, such as a vertical direction.

Ultrasonic sensor 2 includes sensor body 21 having a circular columnar shape extending along center axis 21C extending in upward and downward directions 1001A. Ultrasonic sensor 2 has upper surface 21A and lower surface 21B opposite to each other on center axis 21C. Sensor body 21 accommodates therein and holds a piezoelectric element for sending and receiving ultrasonic waves. Lower surface 21B of sensor body 21 is exposure surface 210 configured to have ultrasonic waves are input and output thereon. Upper surface 21A of sensor body 21 is connected to connector 22. Sensor body 21 accommodates therein and holds a signal processing circuit for processing signals, such as amplification of electric signals, input to the piezoelectric element and noise reduction and amplification of electric signals output from the piezoelectric element. Connector 22 protrudes in a right direction out of right and left directions 1001B perpendicular to center axis 21C of sensor body 21, and has an opening provided at a rightward tip thereof. Plural conductive contacts electrically connected to the signal processing circuit are accommodated in connector 22. More specifically, when a plug provided at one end of an electric wire is inserted into connector 22, a contact of the plug is electrically connected to a contact of connector 22 to establish electrical connection between the electric wire and signal processing circuit.

Figure 3:
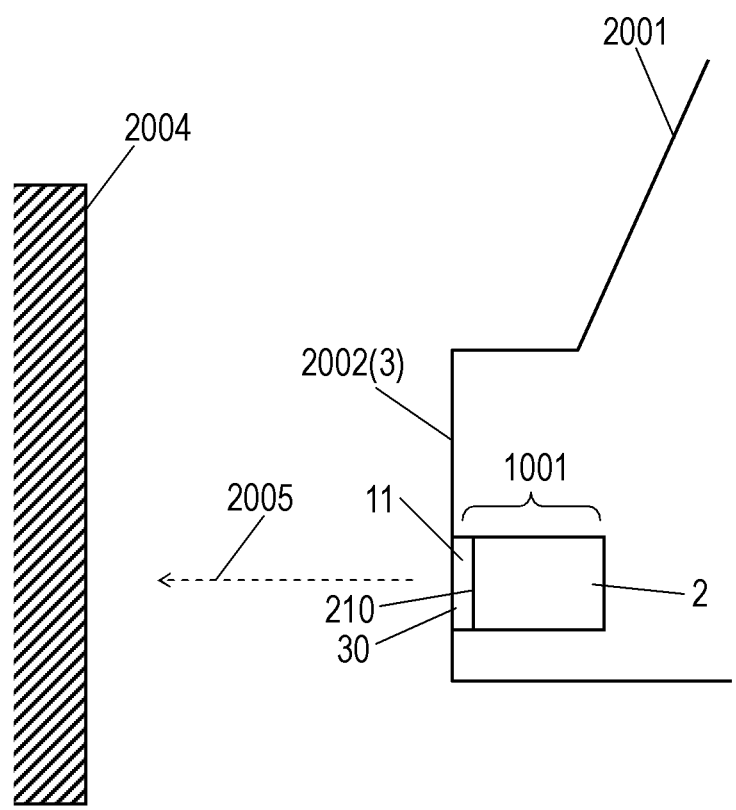
FIG. 3 is a schematic view of a vehicle having the ultrasonic sensor device mounted thereto in accordance with the embodiment.

FIG. 3 is a schematic view of vehicle 2001 having ultrasonic sensor device 1001 in the embodiment mounted thereto. Vehicle 2001 includes exterior plate 2002, such as a bumper. In accordance with the embodiment, exterior plate 2002, such as a bumper, is target device 3. Aperture 30 having a circular shape for exposing exposure surface 210 of ultrasonic sensor 2 from target device 3 is provide in target device 3 (exterior plate 2002). In ultrasonic sensor device 1001, which is an obstacle detector in accordance with the embodiment, ultrasonic sensor 2 is a sensor for detecting obstacle 2004 with ultrasonic wave 2005 emitted from exposure surface 210 via aperture 30.

Fastening device 1 is made of, for example, a single synthetic resin component. Fastening part 11 is a rectangular plate that is flat in upward and downward directions 1001A, and extends in right and left directions 1001B and front and back directions 1001C. Fastening part 11 is bonded to upper surface 3A of target device 3 (e.g., the inner surface of a vehicle bumper) with double-sided adhesive tape 110 attached to lower surface 11B. Aperture 120 passing from upper surface 11A to lower surface 11B is provided in the center of fastening part 11. Sensor body 21 is inserted into aperture 120. Two holder parts 213 and 312 are provided on both sides of aperture 120 in front and back directions 1001C, respectively. Each of holder parts 212 and 312 practically has a plate shape extending in directions perpendicular to a thickness direction along front and back directions 1001C, and protrudes upward from upper surface 11A of fastening part 11. Ultrasonic sensor 2 has two clipping part 23 having a plate shape extending in a direction perpendicular to the thickness direction along front and back directions 1001C. Clipping part 23 is connected to other part of ultrasonic sensor 2 only at the upper portion of clipping part 23. The lower portion of clipping part 23 is resiliently flexible to be displaceable in front and back directions 1001C. Each of holder parts 212 and 312 of fastening device 1 is sandwiched between one clipping part 23 and sensor body 21 in front and back directions 1001C. Holder part 212 has surfaces 212A and 212B opposite to each other. Holder part 312 has surfaces 312A and 312B opposite to each other. Surfaces 212B and 312B of holder parts 212 and 312 face each other in front and back directions 1001C. Surfaces 212A and 312A of holder parts 212 and 312 face outward in directions away from each other along front and back directions 1001C. Engaging projection 121 is provided on each of surfaces 212A and 312A of holder parts 212 and 312. Engaging hole 231 is provided in each of clipping parts 23. Ultrasonic sensor 2 is coupled to fastening device 1 by engaging each of engaging projections 121 with respective one of engaging holes 231. Clipping part 23 temporarily deforms resiliently so as to allow engaging projection 121 to be engaged and disengaged with engaging hole 231. Accordingly, ultrasonic sensor 2 is detachable from fastening device 1. Engaging hole 231 may be an aperture or a recess which opens only to a surface toward holder part 212 or 312.

Linear grooves 111 extending in front and back directions 1001C are provided in upper surface 11A of fastening part 11 on both sides of holder parts 212 and 312 in right and left directions 1001B. Fastening part 11 is thin locally at the bottom of groove 111 so that both ends of fastening part 11 in right and left directions 1001B can deform at maximum upward with respect to the center of fastening part 11 (i.e., with respect to holder parts 212 and 312). Upper surface 11A of fastening part 11 has grooves 112 having V-shapes and extending from the center of both ends in right and left directions 1001B to both ends of groove 111 in front and back directions 1001C. Fastening part 11 is thin locally at the bottom of groove 112 so that four corners of fastening part 11 can deform in upward and downward directions 1001A with respect to the center of fastening part 11.

Fastening device 1 has a shape other than a shape symmetrical in plural turns with respect to axis 11C perpendicular to adhesive surface 11B. In other words, fastening device 1 has a shape asymmetric with respect to axis 11C.

More specifically, as shown in FIGS. 4A and 4B, attachment direction indicator 151 that is a triangular projection is provided at the right end of fastening part 11 while attachment direction indicator 152 that is rectangular projection is provided at the left end of fastening part 11. An instruction to mount a tip of connector 22 to attachment direction indicator 151 to the right-hand side is provided on fastening device 1 or in an instruction manual accompanying fastening device 1. In other words, attachment direction indicators 151 and 152 indicate the direction of ultrasonic sensor 2, which is an object, with respect to fastening device 1.

As shown in FIG. 4A, slide groove 153 opening upward and extending in upward and downward directions 1001A is provided in each of surfaces 212B and 312B of holder parts 212 and 312 facing each other inward in front and back directions 1001C. One slide groove 153 is provided in surface 312B of front holder part 312, and two slide grooves 153 aligned in right and left directions 1001B are provided in back holder part 212.

Figure 5:
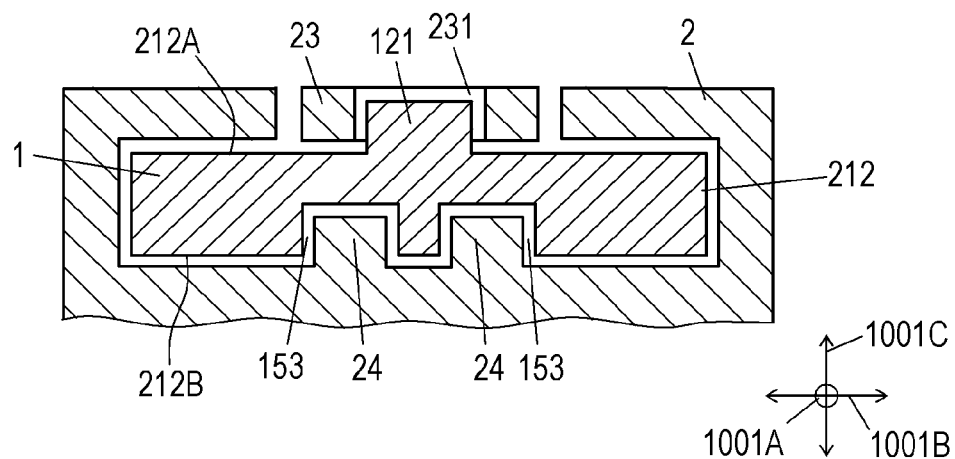
FIG. 5 is a sectional view of the ultrasonic sensor device in accordance with the embodiment.
Figure 6:
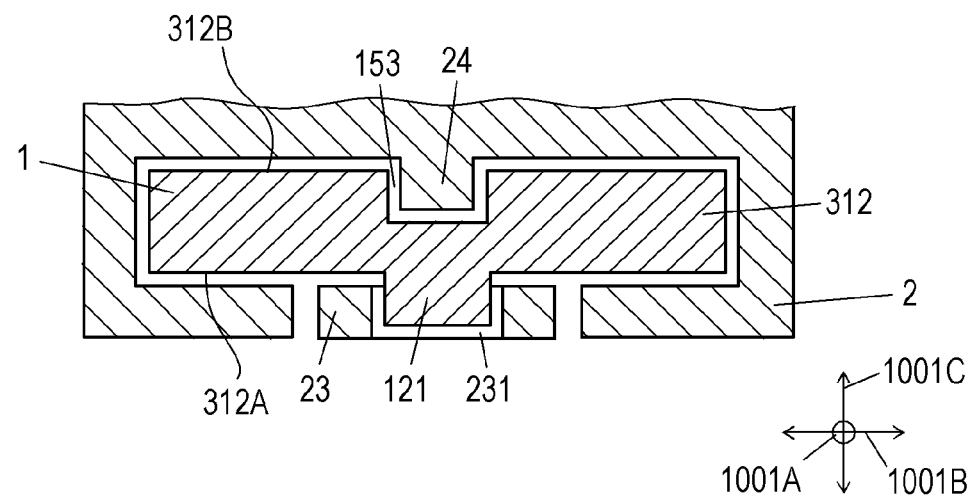
FIG. 6 is a sectional view of another ultrasonic sensor device in accordance with the embodiment.

FIGS. 5 and 6 are sectional views of ultrasonic sensor device 1001, and show parts thereof around holder part 212 and holder part 312. As shown in FIGS. 5 and 6, three slide projections 24 are provided on ultrasonic sensor 2 corresponding to slide grooves 153, respectively. Each slide projection 24 interferes with holder parts 212 and 312 to disable ultrasonic sensor 2 to be attached to fastening device 1 unless slide projections 24 are properly guided to corresponding slide grooves 153. In other words, slide grooves 153 are restricting parts for limiting the direction of ultrasonic sensor 2, which is the object, with respect to fastening device 1.

Fastening device 1 further includes plural connecting parts 13 (four connecting parts 13 in accordance with the embodiment) protruding outward away from each other in right and left directions 1001B from the side surface of fastening part 11, and plural contact parts 14 (four connecting parts 14 in accordance with the embodiment) protruding downward from the tips of connecting parts 13. Four connecting parts 13, i.e., contact parts 14, are provided at four corners of fastening part 11, respectively. Connecting parts 13 have smaller thickness dimension (lengths in upward and downward directions 1001A) than a portion of fastening part 11 where grooves 111 and 112 are not provided, so that contact parts 14 can deform in upward and downward directions 1001A with respect to fastening part 11.

Figure 7:
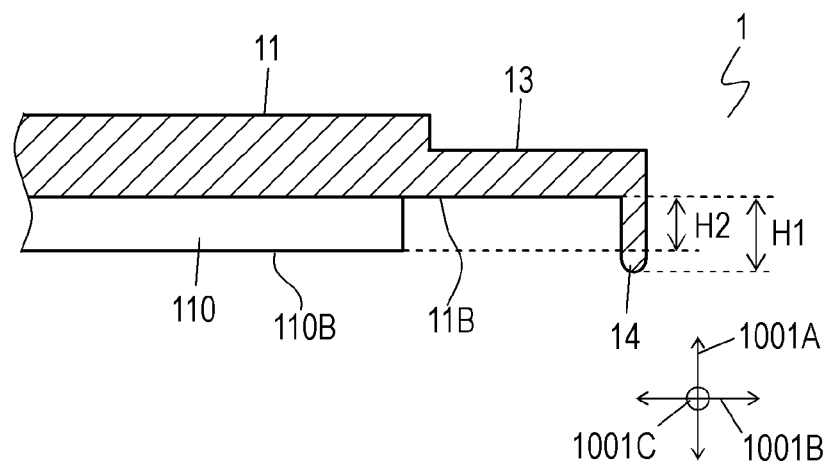
FIG. 7 is a sectional view of the fastening device of the ultrasonic sensor device shown in FIG. 6.

FIG. 7 is a sectional view of fastening device 1, and shows an end of fastening part 11 in right and left directions 1001B. As shown in FIG. 7, contact part 14 protrudes from lower surface 11B by protruding length H1 downward from fastening part 11 while connecting part 13 does not deform. Double-sided adhesive tape 110 attached to lower surface 11B of fastening part 11 protrudes downward from lower surface 110B by protruding length H2. Protruding length H1 is larger than protruding length H2. In other words, while connecting part 13 does not deform, the lower end of contact part 14 protrudes below lower surface 110B of double-sided adhesive tape 110. The lower end of contact part 14 is one side of fastening part 11 in the thickness direction, and protrudes in a direction opposite to a direction in which holder parts 212 and 312 protrude with respect to fastening part 11. Upon connecting part 13 deforming, protruding length H1 of the protrusion of contact part 14 below fastening part 11, i.e., toward target device 3, decreases. In other words, contact part 14 has variable protruding length H1 toward target device 3 from fastening part 11.

Figure 8:
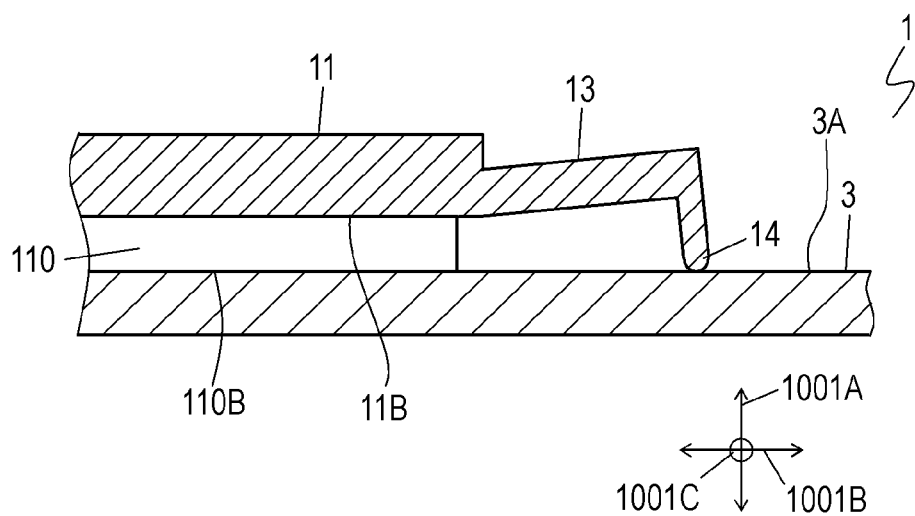
FIG. 8 is a sectional view of an essential part of the fastening device of the ultrasonic sensor device bonded to the target device in accordance with the embodiment.

FIG. 8 is a sectional view of fastening device 1, and shows an end of fastening part 11 in right and left directions 1001B. In a process of fastening fastening device 1 to target device 3, contact part 14 contacts target device 3 before double-sided adhesive tape 110 contacts target device 3. This avoids double-sided adhesive tape 110 from contacting target device 3. After finely adjusting the position of fastening device 1 in this state, fastening part 11 and connecting part 13 deformed by applying a downward force to holder parts 212 and 312, as shown in FIG. 8, to push double-sided adhesive tape 110 against target device 3 and attach double-sided adhesive tape 110 to target device 3.

The above structure allows fastening device 1 to be easily positioned while fastening part 11 and double-sided adhesive tape 110 do not contact target device 3. This improves workability, compared to a fastening device without contact part 14.

Figure 13:
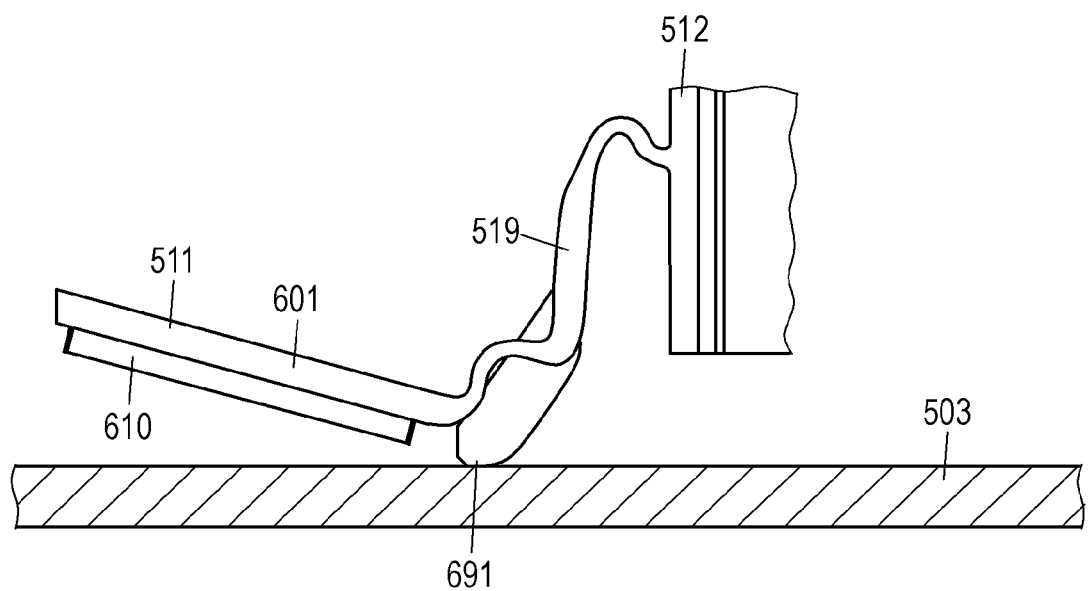
FIG. 13 is a front view of another conventional ultrasonic device.

In conventional fastening device 601 shown in FIG. 13, fastening part 511 to be bonded to target device 503 is connected to holder part 512 holding ultrasonic sensor 502 via bracket 519 having a plate shape. In addition, a connecting part of fastening part 511, holder part 512, and bracket 519 is thinner than other portion. This allows deformation to displace fastening part 511 and bracket 519 with respect to holder part 512. To position fastening device 601 to target device 503, an operator holds holder part 512.

In fastening device 601 in FIG. 13, projection 691 is provided on bracket 519. In other words, projection 691 is provided between fastening part 511 and holder part 512.

Accordingly, in conventional fastening device 601 shown in FIG. 13, projection 691 contacts target device 503 before double-sided adhesive tape 610 contacts target device 503. Projection 691 is positioned between fastening part 511 and holder part 512. Accordingly, to bond fastening part 511 to target device 503 in conventional fastening device 601 shown in FIG. 13, a force needs to be applied to fastening part 511 that is farther from holder part 512 than projection 691 while holder part 512 is held for positioning. This results in low workability.

In contrast, contact part 14 configure to contact target device 3 before double-sided adhesive tape 110 contact target device 3 is provided at a position sandwiching fastening part 11 with each of holder parts 212 and 312 of fastening device 1 in accordance with the embodiment. In other words, contact part 14 is provided on the side opposite to each of holder parts 212 and 312 with respect to fastening part 11. This configuration enables an operator to push fastening part 11 against target device 3 just by applying a force to holder parts 212 and 312 to be held for positioning while bonding fastening part 11 to target device 3. Fastening part 11 can be relatively easily pushed against target device 3 while holder parts 212 and 312 is held while bonding fastening part 11 to target device 3, than conventional fastening device 601 shown in FIG. 13, thus improving workability.

In a process for bonding fastening part 11 to target device 3, if a portion of double-sided adhesive tape 110 far from holder parts 212 and 312 contacts target device 3 before a portion near holder parts 212 and 312 contacts target device 3, holder parts 212 and 312 can hardly be positioned with respect to aperture 30 in target device 3.

Figure 9:
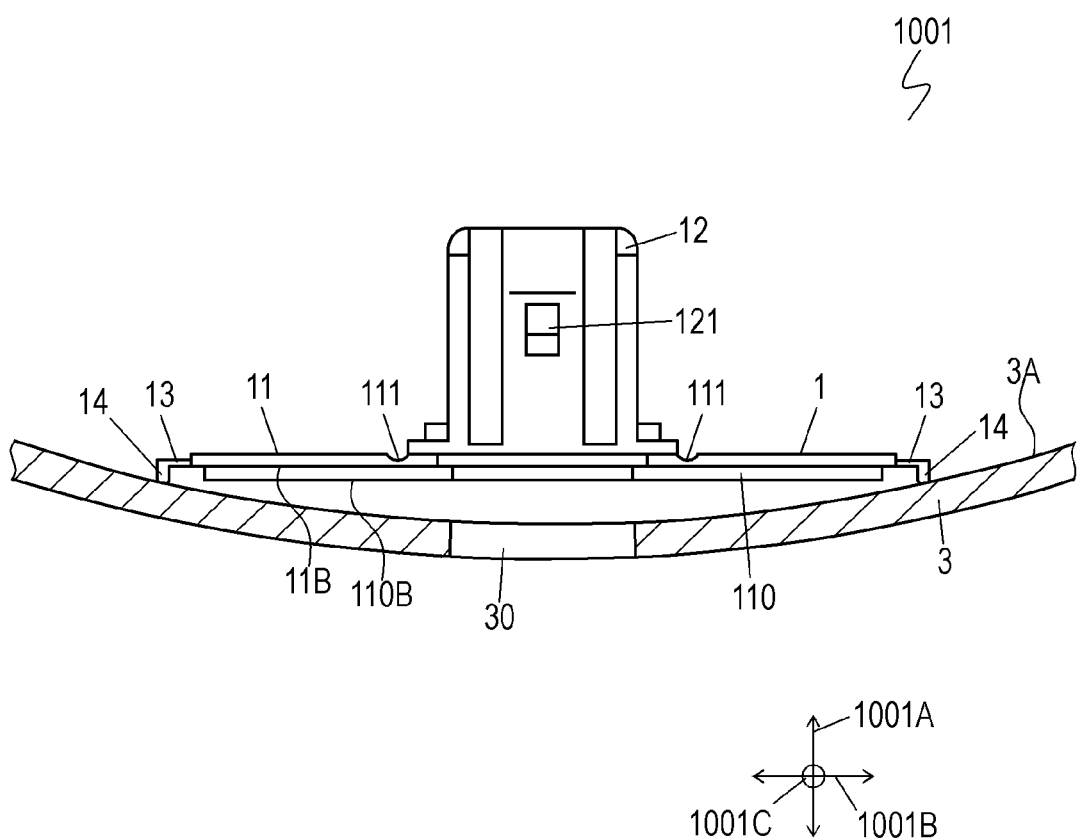
FIG. 9 is a front view of the ultrasonic sensor device in accordance with the embodiment fastened to a curved target device.

FIG. 9 is a front view of ultrasonic sensor device 1001 fastened onto curved target device 3. Particularly in the case that upper surface 3A of target device 3 configured to have fastening part 11 bonded thereto is a concave surface, as shown in FIG. 9, the above problem tends to occur. Since contact part 14 is positioned further away from holder parts 212 and 312 than fastening part 11 in fastening device 1 in accordance with the embodiment, a portion of fastening part 11 (double-sided adhesive tape 110) closer to holder parts 212 and 312 likely contacts target device 3 before a portion of fastening part 11 further from holder parts 212 and 312.

Accordingly, holder parts 212 and 312 of fastening device 1 in accordance with the embodiment can be easily positioned with respect to aperture 30 of target device 3.

Adhesive may be used, instead of double-sided adhesive tape 110 for bonding fastening part 11 to target device 3.

The number of contact parts 14 is not necessarily four. However, to stably keep the position of fastening device 1 while each of contact parts 14 contacts target device 3, three or more contact parts 14 are preferably disposed to surround holder parts 212 and 312 viewing from above (i.e., projecting onto target device 3).

As described above, fastening device 1 is used for fastening object 2 (ultrasonic sensor) onto target device 3. Fastening device 1 includes holder part 212 (312) for holding object 2, fastening part 11 bonded to target device 3, contact part 14 provided at a position sandwiching fastening part 11 with holder part 212 (312), and connecting part 13 for connecting contact part 14 to fastening part 11. Contact part 14 protrudes toward target device 3 more than fastening part 11 by a protruding length and thus contacts target device 3 before fastening part 11 contacts target device 3 when being fastened onto target device 3. Connecting part 13 connects contact part 14 to fastening part 11 such that the protruding length of contact part 14 is variable.

Fastening part 11 may be a plate having adhesive surface 11B in the thickness direction to be bonded to target device 3. In this case, holder part 212 (312) protrudes to one side in the thickness direction (upward and downward directions 1001A) of fastening part 11 more than fastening part 11. Contact part 14 protrudes to the other side in the thickness direction of fastening part 11 more than fastening part 11. In other words, fastening part 11 may be a plate that has adhesive surface 11B bonded to target device 3 and a surface (upper surface 11A) opposite to adhesive surface 11B. In this case, holder parts 212 and 312 protrude more than the surface of fastening part 11 (upper surface 11A), and contact part 14 protrudes more than adhesive surface 11B of fastening part 11.

Connecting part 13 may be connected to fastening part 11 on a surface facing target device 3. In other words, connecting part 13 may be connected to adhesive surface 11B of fastening part 11.

Fastening part 11, connecting part 13, and contact part 14 may be unitarily molded. In this case, connecting part 13 is thinner than fastening part 11 and contact part 14.

In projection to target device 3, three or more contact parts 14 may be disposed as to surround holder part 212 (312).

Figure 10A:
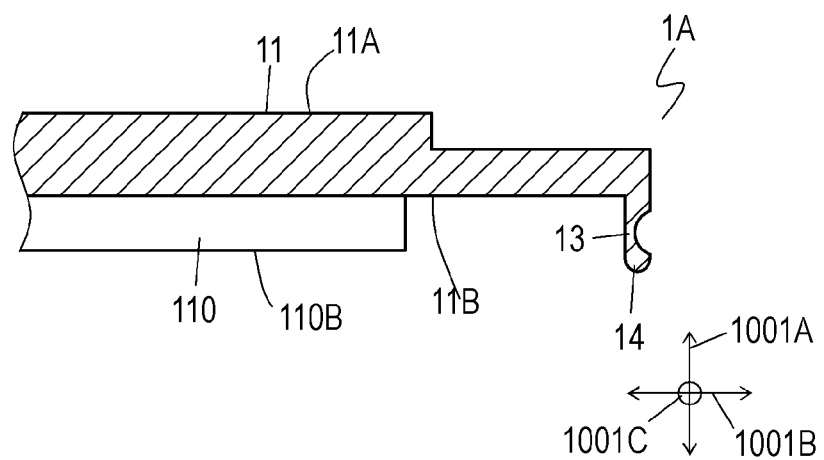
FIG. 10A is a sectional view of still another fastening device in accordance with the embodiment.

FIG. 10A is a sectional view of another fastening device 1A in accordance with the embodiment. In FIG. 10A, components identical to those of fastening device 1 shown in FIG. 7 are denoted by the same reference numerals. In fastening device 1 shown in FIG. 7, the thickness direction of connecting part 13 crosses adhesive surface 11B. In fastening device 1A shown in FIG. 10A, the thickness direction of connecting part 13 is parallel with adhesive surface 11B (right and left directions 1001B in FIG. 10A). In fastening part 11 of fastening device 1A shown in FIG. 10A, contact part 14 is connected to the lower surface which is adhesive surface 11B toward target device 3 via connecting part 13. This configuration reduces a size of fastening device 1 viewing in upward and downward directions 1001A perpendicular to adhesive surface 11B, compared to fastening device 1 including contact part 14 connected to the side surface of fastening part 11, as shown in FIGS. 1 to 8. The area of a portion of target device 3 occupied by fastening device 1 can be reduced.

Figure 10B:
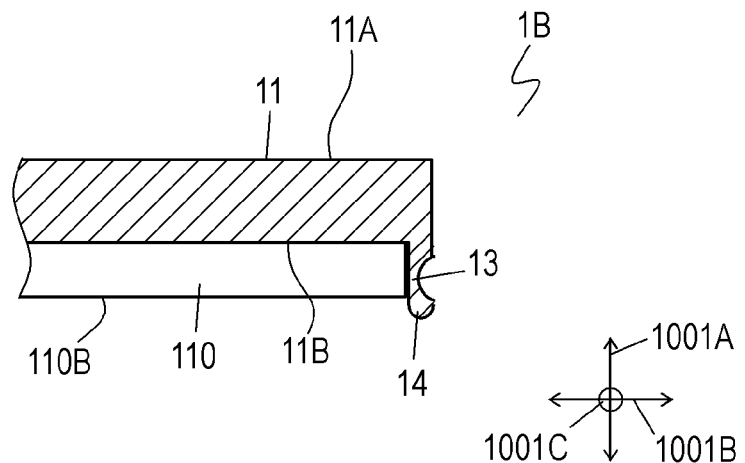
FIG. 10B is a sectional view of a further fastening device in accordance with the embodiment.

FIG. 10B is a sectional view of still another fastening device 1B in accordance with the embodiment. In FIG. 10B, components identical to those of fastening device 1A shown in FIG. 10A are denoted by the same reference numerals. In fastening part 11 of fastening device 1B shown in FIG. 10B, contact part 14 is connected to the lower surface of fastening part 11 toward target device 3, which is adhesive surface 11B, via connecting part 13. This configuration reduces a size of fastening device 1B viewing in upward and downward directions 1001A perpendicular to adhesive surface 11B, compared to fastening device 1 including contact part 14 connected to the side surface of fastening part 11, as shown in FIGS. 1 to 8. In other words, the area of a portion of target device 3 occupied by fastening device 1 can be reduced.

Figure 11A:
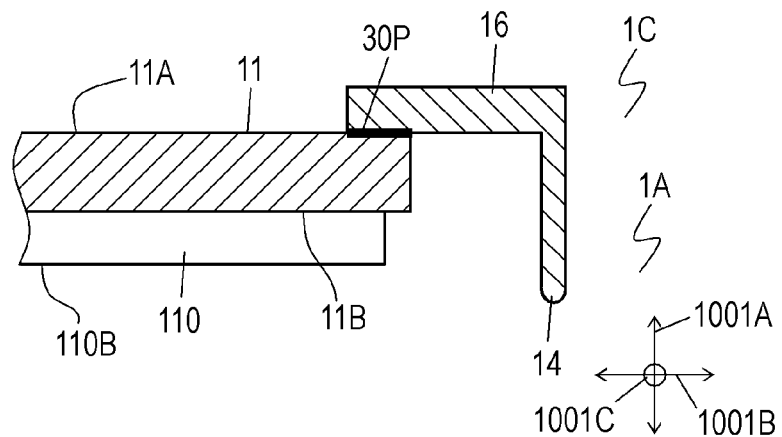
FIG. 11A is a sectional view of a further fastening device in accordance with the embodiment.

FIG. 11A is a sectional view of further fastening device 1C in accordance with the embodiment. In FIG. 11A, components identical to those of fastening device 1 shown in FIG. 7 are denoted by the same reference numerals. In fastening device 1 shown in FIG. 7, fastening part 11, connecting part 13, and contact part 14 are configured as a single component. In fastening device 1C shown in FIG. 11A, contact part 14 is configured as a component separate from fastening part 11. Contact part 14 includes adhesive part 16 that is bonded to upper surface 11A of fastening part 11 by adhesive member 30P, such as adhesive or a double-sided adhesive tape with low adhesion. In this case, adhesive member 30P is peeled off by a repulsive force of target device 3 applied to contact part 14 while fastening fastening device 1 onto target device 3, and thus, adhesive part 16 is removed from fastening part 11 to displace contact part 14. In other words, adhesive member 30P constitutes a connecting part.

Figure 11B:
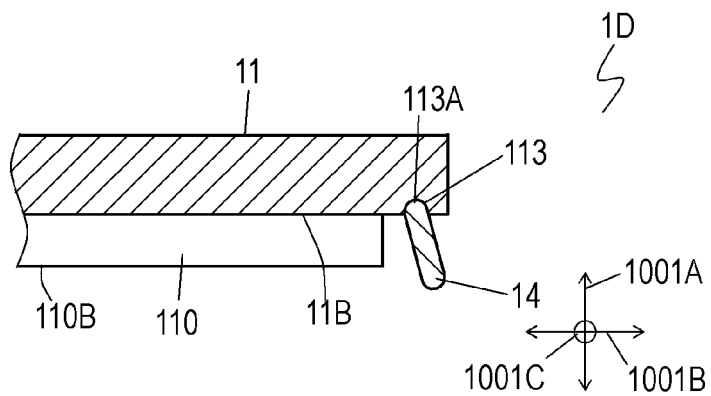
FIG. 11B is a sectional view of a further fastening device in accordance with the embodiment.

FIG. 11B is a sectional view of further fastening device 1D in accordance with the embodiment. In FIG. 11B, components identical to those of fastening device 1 shown in FIG. 7 are denoted by the same reference numerals. In fastening device 1D shown in FIG. 11B, a portion of contact part 14 is accommodated in recess 11 provided in lower surface 11B of fastening part 11. A ball joint 113A, for example, is provided in recess 1B for variably supporting a protruding length of contact part 14 protruding from lower surface 11B of fastening part 11 of fastening device 1D shown in FIG. 11B. Ball joint 113A functions as a connecting part that allows the protruding length of contact part 14 to be variable.

Figure 11C:
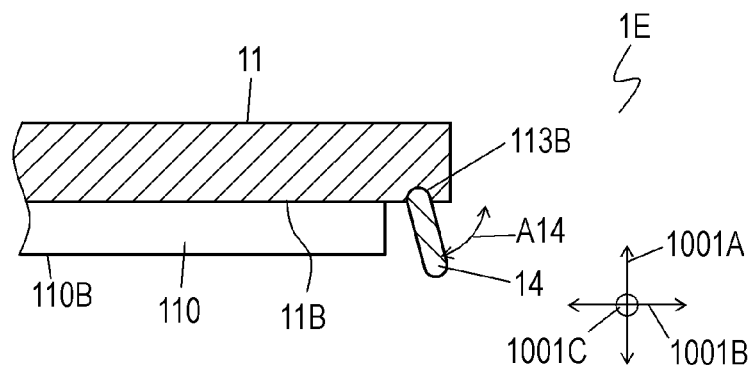
FIG. 11C is a sectional view of a further fastening device in accordance with the embodiment.
Figure 12:
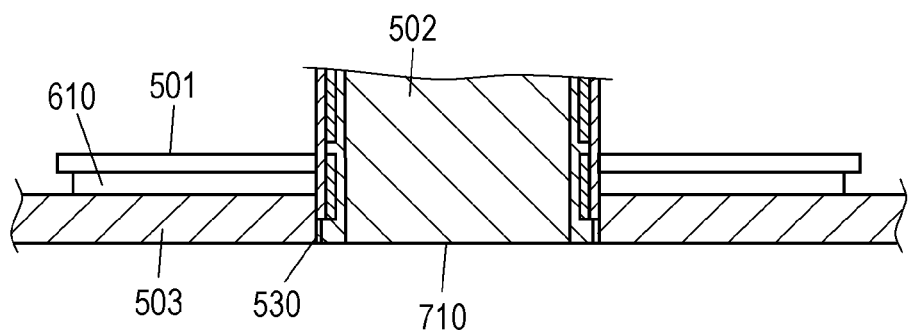
FIG. 12 is a sectional view of a conventional ultrasonic device.

FIG. 11C is a sectional view of further fastening device 1E in accordance with the embodiment. In FIG. 11C, components identical to those of fastening device 1D shown in FIG. 11B are denoted by the same reference numerals. In fastening device 1E shown in FIG. 11C, fastening part 11 includes support 113B that allows tilt angle A14 of contact part 14 to be variable with respect to lower surface 11B. Support 113B functions as a connecting part that allows the protruding length of contact part 14 protruding from adhesive surface 11B of fastening part 11 to be variable.

INDUSTRIAL APPLICABILITY

A fastening device in accordance with the present invention can improve workability of fastening an object, and is thus effectively applicable to devices equipped with the object.

REFERENCE MARKS IN THE DRAWINGS 1, 1A-1D Fastening device
2 Ultrasonic sensor (object)

3 Target device
3A Target surface
11 Fastening part
13 Connecting part
14 Contact part
151 Attachment direction indicator
152 Attachment direction indicator
153 Slide groove (restricting part)
212, 312 Holder part
1001 Ultrasonic sensor device (obstacle detector)
2001 Vehicle
2002 Exterior plate

What is claimed is:

1. A fastening device used for fastening an object to a target device having a target surface, the fastening device comprising:
   a fastening part that has a plate shape having a flat upper surface and a flat lower surface, the lower surface configured to be bonded to the target surface of the target device;
   a holder part configured to hold the object, the holder part protruding from the upper surface of the fastening part;
   a contact part configured to contact the target device, the contact part protruding toward the target surface of the target device by a predetermined length such that a tip of the contact part contacts the target surface of the target device when the object is fastened to the target device; and
   a connecting part connecting the contact part with the fastening part, the connecting part protruding from an end of the fastening part in a first lateral extending direction of the fastening part, and the contact part protruding from an end of the connecting part,
   wherein the connecting part and the contact part are elastically deformable such that the tip of the contact part maintains contact with the target surface of the target device when the object is fastened to the target device.

2. The fastening device of claim 1, wherein the contact part protrudes more than the lower surface of the fastening part.

3. The fastening device of claim 1, wherein the connecting part is connected to the lower surface of the fastening part.

4. The fastening device of claim 1, wherein the fastening part, the connecting part, and the contact part define a unitary component part, and the connecting part is thinner than the fastening part and the connecting part.

5. The fastening device of claim 1, wherein the contact part is at least three contact parts, and the at least three contact parts are disposed along the end of the connecting part so as to surround the holder part and project toward the target device.

6. The fastening device of claim 1, further comprising:
   an attachment direction indicator for indicating a direction in which the object is fixed with respect to the holder part.

7. The fastening device of claim 1, wherein the holder part has a restricting part configured to permit the object to be fastened only in a predetermined direction.

8. The fastening device of claim 1, wherein the fastening part has a groove on the upper surface of the fastening part between the holder and the edge of the fastening part, and the groove extends in a second lateral direction orthogonal to the first lateral direction.

9. An obstacle detector comprising:
   the fastening device of claim 1; and
   a sensor as the object for detecting an obstacle.

10. The obstacle detector of claim 9, wherein the fastening device is fastened to an exterior plate as the target device of a vehicle.

11. The fastening device of claim 1, wherein a protruding direction of the holder part from the fastening part is opposite to a protruding direction of the contact part from the end of the connecting part.

12. The fastening device of claim 1, wherein the contact part protrudes from the end of the connecting part in a direction orthogonal to the first lateral extending direction of the fastening part, and the end of the connecting part is a side edge end of the connecting part.

13. The fastening device of claim 1, wherein the connecting part and the contact part are elastically deformable by a force to be applied to the holder part along a direction opposite to a protruding direction of the holder part.

14. The fastening device of claim 1, further comprising one of a double-sided adhesive tape or an adhesive provided on the lower surface of the fastening part,
   wherein the lower surface of the fastening part is to be bonded to the target surface of the target device via the one of the double-sided adhesive tape or the adhesive, and
   the predetermined length of the contact part protruding toward the target surface of the target device with respect to the lower surface of the fastening part is greater than a thickness of the one of the double-sided adhesive tape or the adhesive.

* * * * *